US012701093B2

(12) United States Patent
Medalion et al.

(10) Patent No.: US 12,701,093 B2
(45) Date of Patent: **\*Aug. 4, 2026**

(54) SYSTEM AND METHOD FOR GENERATING A CHAT RESPONSE USING A LARGE LANGUAGE MODEL

(71) Applicant: GONG.io Ltd., Ramat Gan (IL)

(72) Inventors: Shlomi Medalion, Lod (IL); Ortal Ashkenazi, Kfar-Saba (IL); Guy Netser Eyal, Jerusalem (IL); Eldar Hacohen, Giv'atayim (IL); Adi Rizo, Tel Aviv (IL); Nadav Hoze, Kadima (IL)

(73) Assignee: GONG.io Ltd., Ramat Gan (IL)

( * ) Notice: Subject to any disclaimer, the term of this patent is extended or adjusted under 35 U.S.C. 154(b) by 114 days.

This patent is subject to a terminal disclaimer.

(21) Appl. No.: 18/641,841

(22) Filed: Apr. 22, 2024

(65) Prior Publication Data

US 2024/0356874 A1    Oct. 24, 2024

Related U.S. Application Data

(60) Provisional application No. 63/497,902, filed on Apr. 24, 2023.

(51) Int. Cl.
*H04L 51/02* (2022.01)
*G06F 40/20* (2020.01)
*G06Q 30/0207* (2023.01)

(52) U.S. Cl.
CPC .............. *H04L 51/02* (2013.01); *G06F 40/20* (2020.01); *G06Q 30/0207* (2013.01)

(58) Field of Classification Search
CPC ......... H04L 51/02; G06F 40/20; G06F 40/35; G06Q 30/0207
See application file for complete search history.

(56) References Cited

U.S. PATENT DOCUMENTS

| | | | |
|---|---|---|---|
| 6,101,480 | A | 8/2000 | Conmy et al. |
| 6,219,639 | B1 | 4/2001 | Bakis et al. |

(Continued)

FOREIGN PATENT DOCUMENTS

| | | |
|---|---|---|
| EP | 3432155 A1 | 1/2019 |
| WO | 2019016119 A1 | 1/2019 |

OTHER PUBLICATIONS

Su, Hongjin, et al., "One Embedder, Any Task: Instruction-Finetuned Text Embeddings", 2022, pp. 1-9, Date accessed Apr. 19, 2024.

(Continued)

*Primary Examiner* — Soe Hlaing

(57) ABSTRACT

A system and method for generating LLM-based chatbot responses are provided. The method includes generating, using a first specific-trained language model (STLM), which returns a set of filters based on an input question, wherein the input question relates to at least one sales call; filtering a call dataset based on the set of filters, wherein the set of filters is applied to metadata included in the call dataset, wherein the call dataset further includes at least transcripts; embedding the input question into a vector representation; comparing the vector representation of the input question to vector representations of textual information stored in the call dataset to retrieve a target dataset; engineering a prompt to provide a single coherent command including information in the target dataset and the input question; and feeding the engineered prompt to a second STLM to retrieve an answer to the input question.

19 Claims, 10 Drawing Sheets

(56) References Cited

U.S. PATENT DOCUMENTS

| | | |
|---|---|---|
| 7,574,409 B2 | 8/2009 | Patinkin |
| 8,214,242 B2 | 7/2012 | Agapi et al. |
| 8,706,678 B2 | 4/2014 | Stefik |
| 9,479,736 B1 | 10/2016 | Karakotsios |
| 10,282,759 B1 | 5/2019 | King et al. |
| 10,318,927 B2 | 6/2019 | Champaneria |
| 10,642,889 B2 | 5/2020 | Reshef et al. |
| 12,118,324 B1 | 10/2024 | Zhang et al. |
| 12,141,677 B2 | 11/2024 | Silver et al. |
| 12,182,728 B1 | 12/2024 | Wick et al. |
| 12,190,864 B1 | 1/2025 | Xiao et al. |
| 12,229,522 B2 | 2/2025 | Gajek et al. |
| 2009/0119095 A1 | 5/2009 | Beggelman et al. |
| 2009/0125998 A1 | 5/2009 | Levy |
| 2014/0214402 A1 | 7/2014 | Diao et al. |
| 2017/0083507 A1 | 3/2017 | Ho et al. |
| 2018/0176508 A1 | 6/2018 | Pell |
| 2019/0318743 A1 | 10/2019 | Reshef et al. |
| 2020/0012886 A1 | 1/2020 | Walters et al. |
| 2020/0265102 A1 | 8/2020 | Ho et al. |
| 2020/0293427 A1 | 9/2020 | Walters et al. |
| 2021/0027772 A1 | 1/2021 | Horev et al. |
| 2021/0103608 A1 | 4/2021 | Ganti et al. |
| 2021/0286832 A1 | 9/2021 | Prasad Tanniru et al. |
| 2021/0406735 A1 | 12/2021 | Nahamoo et al. |
| 2022/0092028 A1 | 3/2022 | Layton et al. |
| 2022/0115019 A1 | 4/2022 | Bradley et al. |
| 2022/0189489 A1 | 6/2022 | Peeler et al. |
| 2022/0245340 A1 | 8/2022 | Yang et al. |
| 2023/0112096 A1 | 4/2023 | Choi et al. |
| 2023/0153177 A1 | 5/2023 | Walters et al. |
| 2023/0162733 A1 | 5/2023 | Moorsom et al. |
| 2023/0169276 A1* | 6/2023 | Cook ...................... G06F 40/30 706/11 |
| 2023/0297786 A1* | 9/2023 | Park ........................ G06F 40/40 704/9 |
| 2023/0360640 A1 | 11/2023 | Asi et al. |
| 2023/0376697 A1 | 11/2023 | Chow et al. |
| 2024/0273292 A1 | 8/2024 | Lakshmin et al. |
| 2024/0289366 A1 | 8/2024 | Hranj et al. |
| 2024/0330589 A1* | 10/2024 | Kotaru ................. G06F 40/205 |
| 2024/0355318 A1* | 10/2024 | Beaver ................. G10L 15/063 |
| 2024/0403333 A1 | 12/2024 | Bertschinger |
| 2024/0428017 A1* | 12/2024 | Shoham ................ G06F 16/243 |
| 2025/0124053 A1 | 4/2025 | Beltran et al. |
| 2025/0181834 A1 | 6/2025 | Joshi et al. |

OTHER PUBLICATIONS

Su, Hongjin, et al., "One Embedder, Any Task: Instruction-Finetuned Text Embeddings", May 30, 2023, pp. 1-18, Date Accessed Apr. 19, 2024.

Great Learning Team. "Understanding Latent Dirichlet Allocation (LDA)". Oct. 16, 2020. https://www.mygreatlearning.com/blog/understanding-latent-dirichlet-allocation/.

* cited by examiner

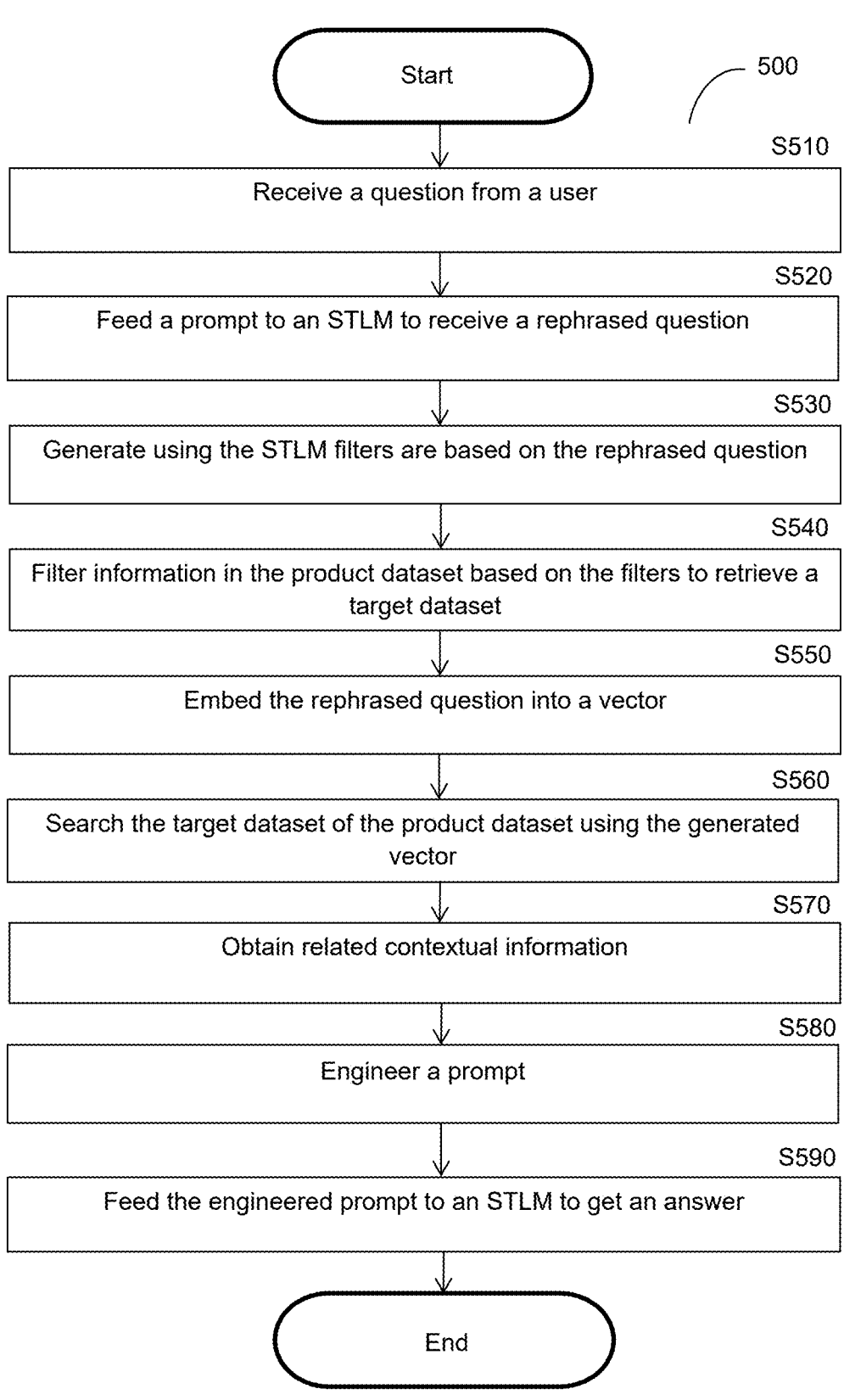

Start

500

S510

Receive a question from a user

S520

Feed a prompt to an STLM to receive a rephrased question

S530

Generate using the STLM filters are based on the rephrased question

S540

Filter information in the product dataset based on the filters to retrieve a target dataset

S550

Embed the rephrased question into a vector

S560

Search the target dataset of the product dataset using the generated vector

S570

Obtain related contextual information

S580

Engineer a prompt

S590

Feed the engineered prompt to an STLM to get an answer

End

SYSTEM AND METHOD FOR GENERATING A CHAT RESPONSE USING A LARGE LANGUAGE MODEL

CROSS-REFERENCE TO RELATED APPLICATIONS

This application claims the benefit of U.S. Provisional Application No. 63/497,902 filed on Apr. 24, 2023, the contents which are hereby incorporated by reference.

TECHNICAL FIELD

The present disclosure generally relates to techniques for improving the accuracy and efficiency of chatbot conversations including chat response generation.

BACKGROUND

Currently, users of transcription services that record information for businesses may need to apply pre-set filters to a recording or transcript and engage in the tedious reading of the recording or transcript before finding the information that they are looking for in the recording or transcript. Unfortunately, existing solutions are generally constrained to specific formats or a set of pre-defined questions from which the user must choose, and as such, face challenges in responding to user requests that deviate from these formats or pre-defined questions.

After the widespread adoption of Large Language Models (LLMs), such as Generative Pre-trained Transformer 3 (GPT3) and Generative Pre-trained Transformer 4 (GPT4), many users have come to prefer interacting with systems and applications in free-form text (i.e., asking questions and receiving answers without being constrained or tied to a specific format or a set of pre-defined questions). Unfortunately, existing solutions such as GPT3 and GPT4 face challenges in searching through an entire databank in terms of its available input and filtering to search the data. Also, a user's session data from a given session is not currently saved when the user enters a new session.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for generating an LLM-based chatbot response to an input question. The method comprises: generating, using a first specific-trained language model (STLM), which returns a set of filters based on an input question, wherein the input question relates to at least one sales call; filtering a call dataset based on the set of filters, wherein the set of filters is applied to metadata included in the call dataset, wherein the call dataset further includes at least transcripts; embedding the input question into a vector representation; comparing the vector representation of the input question to vector representations of textual information stored in the call dataset to retrieve a target dataset; engineering a prompt to provide a single coherent command including information in the target dataset and the input question; and feeding the engineered prompt to a second STLM to retrieve an answer to the input question.

Certain embodiments disclosed herein also include a non-transitory computer-readable medium having stored thereon causing a processing circuitry to execute a process, the process comprising: generating, using a first specific-trained language model (STLM), which returns a set of filters based on an input question, wherein the input question relates to at least one sales call; filtering a call dataset based on the set of filters, wherein the set of filters is applied to metadata included in the call dataset, wherein the call dataset further includes at least transcripts; embedding the input question into a vector representation; comparing the vector representation of the input question to vector representations of textual information stored in the call dataset to retrieve a target dataset; engineering a prompt to provide a single coherent command including information in the target dataset and the input question; and feeding the engineered prompt to a second STLM to retrieve an answer to the input question.

Certain embodiments disclosed herein also include a system for generating an LLM-based chatbot response to an input question. The system comprises: a processing circuitry; and a memory, the memory containing instructions that when executed by the processing circuitry, configure the system to: generate, using a first specific-trained language model (STLM), which returns a set of filters based on an input question, wherein the input question relates to at least one sales call; filter a call dataset based on the set of filters, wherein the set of filters is applied to metadata included in the call dataset, wherein the call dataset further includes at least transcripts; embed the input question into a vector representation; compare the vector representation of the input question to vector representations of textual information stored in the call dataset to retrieve a target dataset; engineer a prompt to provide a single coherent command including information in the target dataset and the input question; and feed the engineered prompt to a second STLM to retrieve an answer to the input question.

BRIEF DESCRIPTION OF THE DRAWINGS

The subject matter disclosed herein is particularly pointed out and distinctly claimed in the claims at the conclusion of the specification. The subject matter disclosed herein, and other objects, features, and advantages of the disclosed embodiments will be apparent from the following detailed description in conjunction with the accompanying drawings.

FIG. 5 is a flowchart illustrating a method for operating a chatbot-based LLM to respond to questions about product development according to an embodiment.

DETAILED DESCRIPTION

Figure 1:
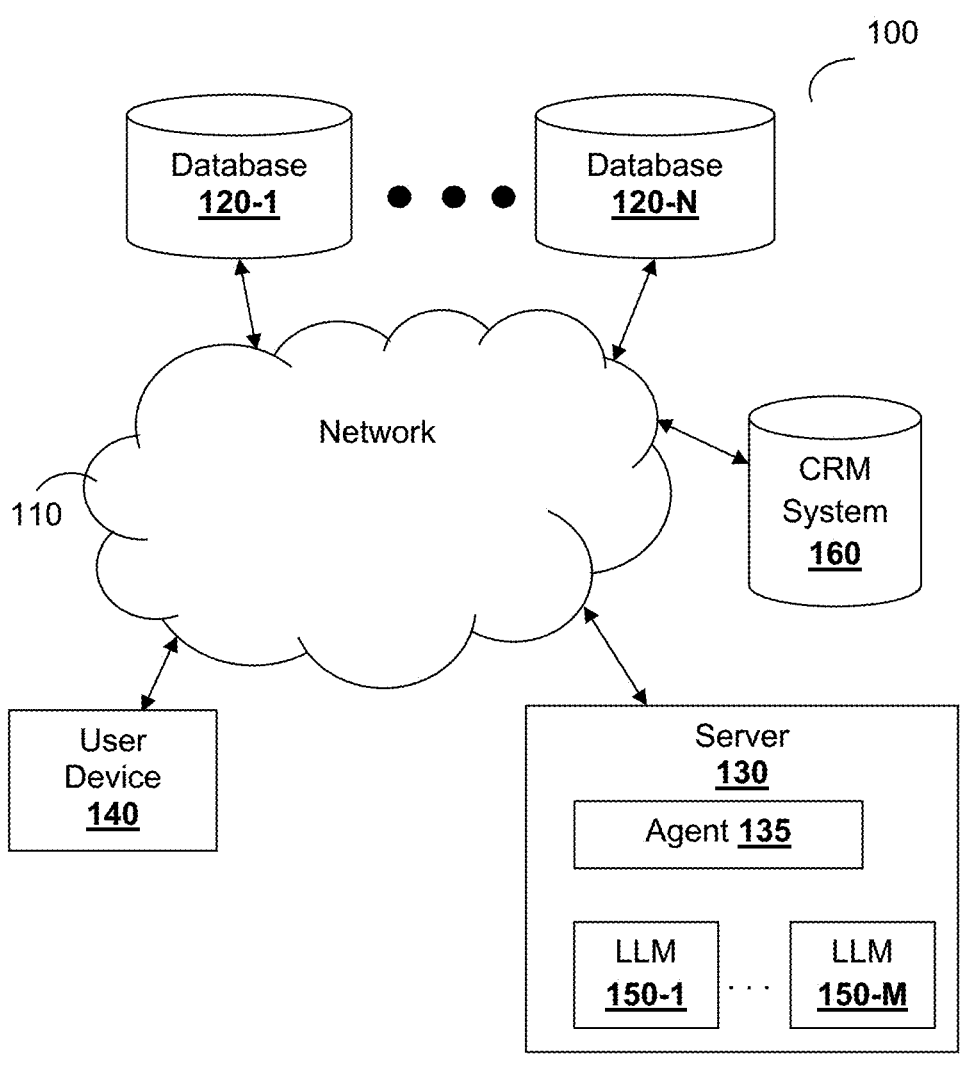
FIG. 1 is a network diagram utilized to describe various disclosed embodiments.

It is important to note that the embodiments disclosed herein are only examples of the many advantageous uses of the innovative teachings. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, numerals refer to like parts through several views.

The disclosed embodiments include methods and systems for an agent configured to interpret a user's question, retrieve relevant data, and package the retrieved data from a large language model (LLM). Then, the agent is configured to receive the result from the LLM and display such results in various ways.

The disclosed embodiments improve the currently available LLM systems by improving the accuracy of the generated response to the user's question. The accuracy of the generated response (answer) is based on the engineered prompt, where the user's question is enriched with contextual information from various data sources. Another improvement of the disclosed embodiments is the search extraction of meta-data filters based on the question, which allows computer processing systems to search efficiently through a condensed dataset for an accurate response. The extracting of meta-data filters from the question saves the computer processing system ample time and resources in searching through the dataset for an accurate response because the filters narrow the amount of data the processor needs to search through to find the accurate response.

Furthermore, human operators subjectively evaluate the importance and classification of speech content during business meetings and calls based on their own educational experiences, professional experiences, and memory, which often leads to inaccurate responses to questions regarding business meetings, deals, projects, etc. However, the disclosed embodiments provide an objective and consistent response to a question regarding business meetings, business deals, and projects because the response is based on actual data from call transcripts, emails, instant messages, and the like.

FIG. 1 shows an example network diagram 100 utilized to describe the various embodiments. In the example network diagram 100, a plurality of databases 120-1 through 120-N (hereinafter referred to individually as a database 120 and collectively as databases 120, merely for simplicity purposes), a server 130, a user device 140, and a Customer Relationship Management (CRM) system 160 communicating via a network 110. In an embodiment, the network diagram 100 includes at least one server 130 that may be deployed in the network 110. The server 130 is configured to execute an agent 135, one or more large language models (LLMs) 150-1 through 150-M (hereinafter referred to individually as an LLM 150 and collectively as LLMs 150, merely for simplicity purposes). An LLM is a type of artificial intelligence (AI) system designed to understand, generate, and work with human language at a large scale. These models are trained on vast amounts of text data, enabling them to perform a wide range of language-related tasks. Such tasks include answering questions, writing essays, summarizing texts, translating languages, and even engaging in conversations in a manner that can resemble human-like understanding and responses.

An LLM 150 may include, for example, T5, GPT3, GPT4, and the like. According to an embodiment, one or more of the LLMs 150 may be specifically trained on customer data, such as discussed in detail below. The network 110 may include but is not limited to, a wireless, cellular, or wired network, a local area network (LAN), a wide area network (WAN), a metro area network (MAN), the Internet, the world wide web (WWW), similar networks, and any combination thereof.

A database 120 stores message data that may be related to textual conversations, for example, but not limited to, conversations between customers and company representatives or sales professionals. Such message data may include but is not limited to, electronic mail (email) messages, chat logs, instant messages, or other text, or data otherwise, including contents of communications or content related to communications between and among individuals. The messages may be realized as types of communications such as, but not limited to, emails, short message service (SMS) messages, text messages, instant messages, social media posts, calls' statistics (e.g., who spoke, how much, and when), portions thereof, and the like. Such data may, therefore, include messages for which it is desirable to follow up or summarize, for example, to complete a sale or provide assistance. As noted above, a significant amount of such message data may be generated on any given day, particularly for large call centers with hundreds or thousands of employees.

A database 120 also includes transcript data related to audio/video conversations, for example, but not limited to, audio/video conversations between customers and company representatives or sales professionals. Such transcript data may include, but is not limited to, transcripts obtained from web conference calls, phone calls, and the like. A database 120 also includes topic data related to topics identified through each call. A topic is the context of the subject matter in the text. Examples of topics include the subject matter of, for example, but not limited to, "small talk," "pricing," "next step," "contract," "sports," and so on. A database 120 also includes sentiment data identifying a sentiment through each call. Sentiment may be positive, negative, or neutral.

A database 120 may further store customer data obtained from the CRM system 160. Such data may include customer details, deal information, and so on. A database 120 may store textual data, which includes both transcript and message data.

A server 130 is configured to implement a chatbot to provide answers to sales, specific deals, products, the timeline of sales or product releases, and so on. To this end, server 130 is configured to receive a question from a user, retrieve information from database 120 to enrich the question with context, and generate a prompt for the LLM 150. This process is interactive (i.e., interactively retrieving information from the user and replying to the same). In certain embodiments, discussed in detail below, at least one LLM (e.g., LLM 150-1) is being utilized as a specific-trained language model (hereinafter STLM).

In an embodiment, the server 130 is also configured to retrieve information from the databases 120, including at least transcript data, message data, topics data, sentiment data, and customer data. Such information is about a specific customer. The server 130 is further configured to process data at the conversation level. Additionally, the server 130 may process correspondence data (e.g., emails, text messages, instant messages, etc.) and data at a sales level (typically obtained from a CRM system).

In an embodiment, the operation of the chatbot is executed by an agent 135. In an embodiment, the agent 135 is instantiated in at least one server 130. The server 130 may be realized as a physical machine or virtual machine (or any other type of virtual assistant). The agent 135 may be realized as a software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code).

A user device (UD) 140 may be but is not limited to, a personal computer, a laptop, a tablet computer, a smartphone, a wearable computing device, or any other device capable of receiving and displaying the chatbox.

According to the disclosed embodiments, a user of a user device 140 may enter a question about a sales call, deal, or a group of deals related to the customer data stored in the database 120. The question may be typed in a natural language without a specific structure or may be a voice recording. An instant of an agent 135 at the server 130 is created to capture the input question and provide an answer to the question. In an embodiment, an instant of an agent 135 is created for each user device 140 submitting questions. To this end, agent 135 may rephrase the question using one or more LLMs.

Then, the agent may derive from the question. For example, if the question is for specific parts of the call, such as when a specific slide was shown or related to a specific topic, or if the question is about what was said by the prospect or the sales representative, such information is used to filter the monologues in the retrieval phase. The filter would be related to fields in a meta-data, for example, in recorded calls that we can filter upon. For example, entering a question such as: "What are the customer's concerns in the last two weeks?" would generate a response from an LLM 150 in the following JSON format: {"initial_date": "2023 Mar. 1", "final_date": "2023 Mar. 14", "speaker_affiliation": "NON_COMPANY"}. The filters in the example are "initial date" and "final date". The filters allow the retrieval of only relevant datasets (e.g., monologues in the relevant calls or paragraphs in emails from the last two weeks) that occurred in this range of dates.

The agent 135 may further embed the (rephrased) question into a vector representation in the answers space. A number of vector embedding techniques are discussed in detail below. The agent 135 may further search, for example, all relevant datasets (e.g., monologues) from the call using vector (semantic) similarity to the question and using the filters. Note that the search of the monologues is relevant to the identified filters.

Then, for each of the relevant or allegedly relevant datasets (e.g., monologues), the agent 135 may augment and find relevant entities from other data sources. For example, related sale pipelines from the CRM system 160. The agent 135 may further aggregate all relevant data in a single coherent prompt along with the question and feed the prompt to one of the LLMs, for example, and without limitation, STLM 150-1. The output of the STLM is the answer. The user may rank the correctness of the answer, and the best answers may be used for future reference. In an embodiment, if the user asks another question, following the previous ones, the same process is applied by the agent 135.

The datasets used in the described process may be stored in one or more databases 120. The datasets being searched depend on the type of question(s) being asked. In an embodiment, a question type is about a deal or a group of deals that a sales representative (user) is working on. Examples of such questions may include "Where do you think the deal is heading? Or "Which person should I involve in the deal now?". In this embodiment, a deal dataset is being searched. The deal dataset may include sales calls (transcripts thereof), emails, messages encoded into monologues, paragraphs, and the like. The deal dataset may be of all the deals related to the user, a user's team, and/or organization. Textual information in the deal dataset is also with metadata and pre-calculated vector representation. For example, for an email (textual information) the vector representation is pre-calculated over the email message's text. The metadata in this example may include the date the email was sent/received, the sender, the recipient, and the like.

In yet another embodiment, a question type is about a sale call (e.g., "What are the customer's concerns in the last two weeks?"). In this embodiment, the call dataset is transcripts of calls conducted by a user, a user's team, and/or anyone in the organization. The call dataset includes per call's transcripts, its respective metadata and vector representation pre-calculated over the transcripts. The metadata in this example may include the date/time of the call, participants, call topics (a call topic is the context of the subject matter in the call transcripts), and the like.

In yet another embodiment, a question type is about a product (e.g., features, timelines, etc.). In this embodiment, the product dataset includes textual data related to a product, its features, and its development/production timeline. Such data can be gathered from instant messaging (IM) channels (e.g., Slack, WhatsApp's, etc.), help center documents, product boards, Airtable (a product update, plans, and timeline). The pieces of textual data are stored in respective metadata and pre-calculated vector representation.

It should be noted that the embodiments disclosed herein are not limited to the specific architecture illustrated in FIG. 1 and that other architectures may be equally used without departing from the scope of the disclosed embodiments. Specifically, a server 130 may reside in a cloud computing platform, a data center, on-premises, and the like. Moreover, in an embodiment, there may be a plurality of servers 130, where each server may include a plurality of agents. Further, database 120 may be part of server 130, cloud storage, and/or a stand-alone storage device.

Figure 2:
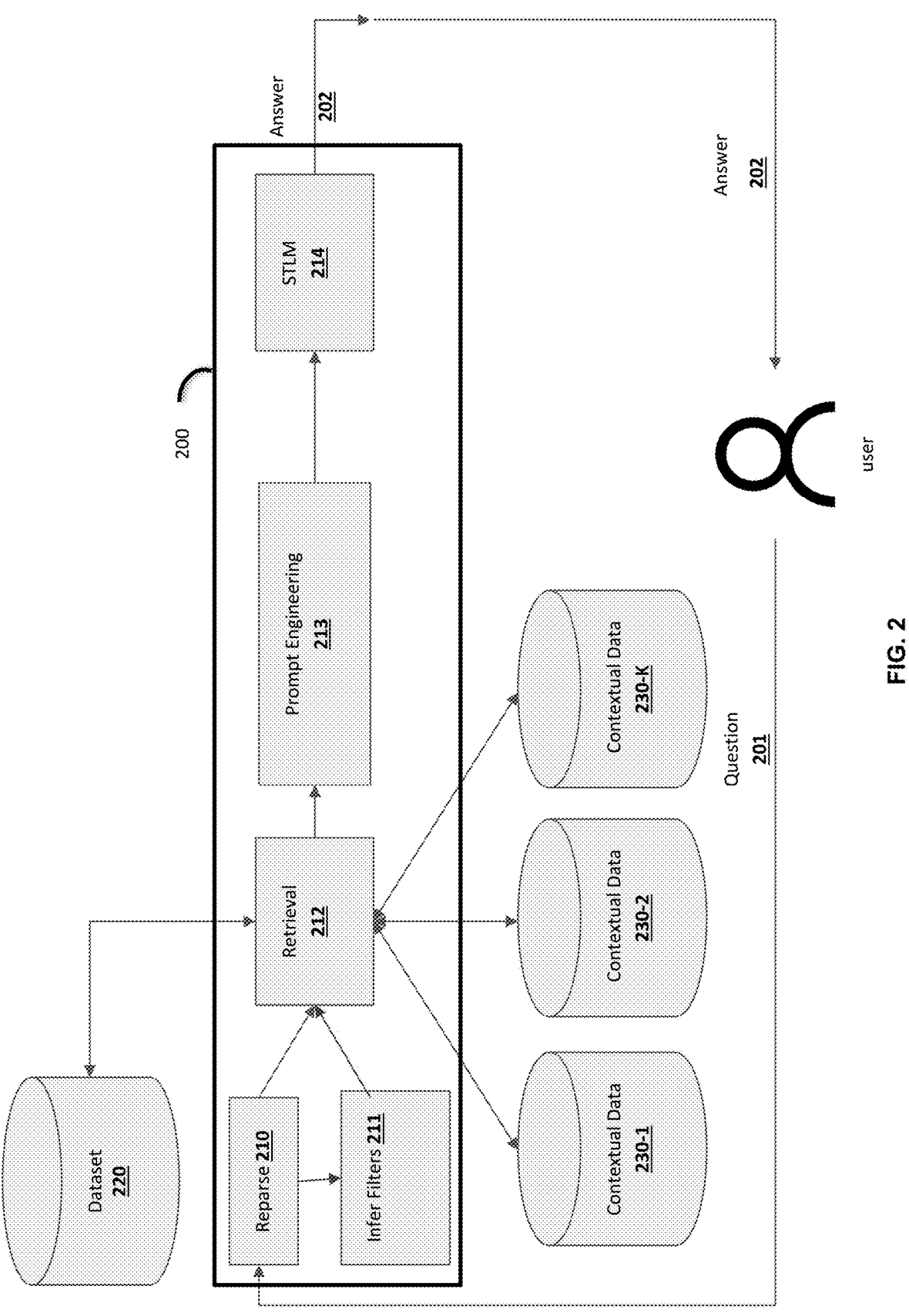
FIG. 2 is a flow diagram illustrating the operation of an agent according to an embodiment.

FIG. 2 shows an example flow diagram 200 illustrating the operation of an agent according to an embodiment. As discussed above, the agent is executed over a server 130 and functions as a chatbot, retrieves data, answers data in response to a user question, and so on.

As illustrated in FIG. 2, a user may ask the agent (chatbot) a question 201. A question 201 may be related to a sale call or calls, a deal, or a group of deals of an organization with one or more customers, a product, and the like. The question may be an input text or an audio-based input transformed into text using automatic speech recognition (ASR) technology.

In box 210, question 201 may be rephrased, for example, by feeding the question to an LLM model. This includes reparsing questions more coherently without losing relevant details.

In box 211, a set of filters is inferred from question 201 (or the rephrased version). This includes feeding question 201 to an LLM that may or may not be trained based on specific data. The filters are required to obtain vectors from dataset 220. The filters may be related to the metadata stored together with the textual information in dataset 220. As noted above, the contents of dataset 220 may include the call dataset, the deal dataset, and the product dataset. Each such dataset includes textual information, its respective vector representations, and metadata. The filters may be in a JavaScript Object Notation (JSON) format.

In box 212, retrieval of prompt data is performed. This includes retrieval of all information to later generate a concise and accurate prompt. The retrieval process includes embedding the question into a vector representation. Various embodiments for achieving vector representation are discussed below. The retrieval process includes filtering datasets based on the filters and searching in the filtered dataset for vectors matching the question vector. The retrieval process may also include retrieving contextual data from a data source 230 or a plurality of data sources 230-1 through 230-K (hereinafter referred to individually as contextual data 230 and collectively as contextual data 230, merely for purposes of simplicity). The contextual data being retrieved may depend on the question being asked. Some examples are context data.

In box 213, a prompt is engineered. This includes arranging information provided by the retrieval process in a single coherent prompt along with the question.

In box 214, the prompt is fed to an STLM to generate answer 202, which returns to the user. The STLM is an LLM, such as, but not limited to, T5, Generative Pre-trained Transformer (GPT), GPT3, GPT4, and the like, trained on a specific customer's data.

The operation of an agent (chatbot), as discussed here, can be utilized to ask anything about a sales pipeline or process. In one embodiment, the agent is configured to answer questions related to a sale call or calls. According to this embodiment, dataset 220 includes a call dataset containing transcripts of calls conducted by a user, a user's team, and/or anyone in the organization. The call dataset includes per call's transcripts, its respective metadata and vector representation pre-calculated over the transcripts. The metadata in this example may include the date/time of the call, participants, call topics (a call topic is the context of the subject matter in the call transcripts), and the like. Further, according to this embodiment, the contextual data 230 may include CRM data retrieved from a CRM system, emails and other correspondences with prospects, or any documentation related to the sale process or pipeline.

In one embodiment, the agent is configured to answer questions related to a specific deal or a group of deals. According to this embodiment, dataset 220 includes a deal dataset containing sales calls (transcripts thereof), emails, messages encoded into monologues, paragraphs, and the like. The deal dataset may be of all the deals related to the user, a user's team, and/or organization. Textual information in the deal dataset is also with metadata and pre-calculated vector representation. For example, for an email (textual information) the vector representation is pre-calculated over the email message's text. The metadata in this example may include the date the email was sent/received, the sender, the recipient, and the like. Further, according to this embodiment, the contextual data 230 may include CRM data retrieved from a CRM system, historic data related to past deals, other deals with the same customers or other customers, and the like.

In yet another embodiment, the agent 135 is configured to answer questions related to product development. According to this embodiment, dataset 220 includes a product dataset containing textual data related to a product, its features, and its development/production timeline. Such data can be gathered from instant messaging (IM) channels (e.g., Slack, WhatsApps, etc.), help center documents, product boards, and Airtable (a product update, plans, and timeline). The pieces of textual data are stored in respective metadata and pre-calculated vector representation. Further, according to this embodiment, the contextual data 230 may include documentation related to similar products or past versions of the same product.

In all of the above embodiments, the contextual data 230 may include the best answers for different categories of answers. Best answers may be ranked by a user.

Figure 3:
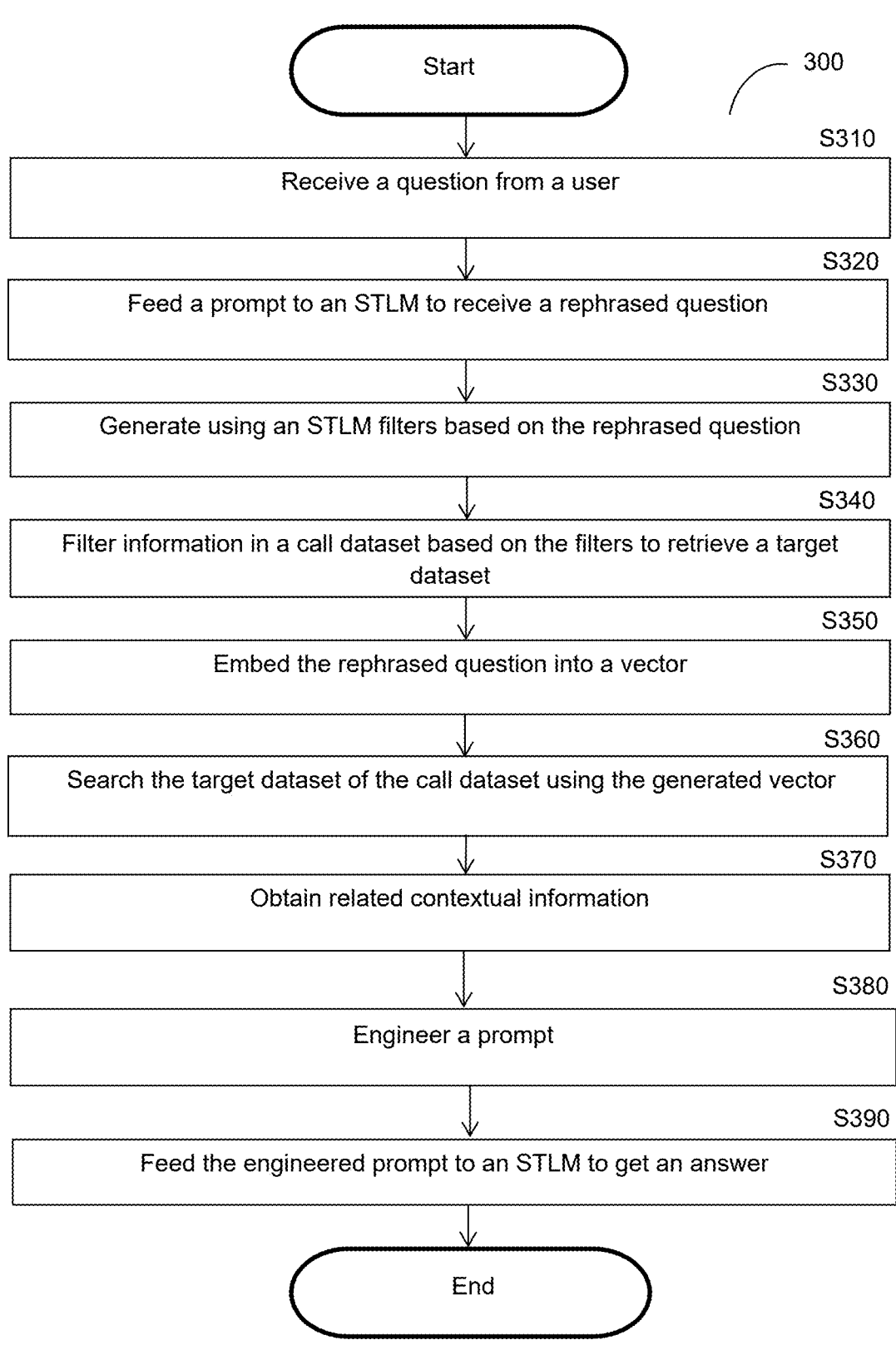
FIG. 3 is a flowchart illustrating a method for operating a chatbot-based LLM to respond to questions about a sales deal or a group of deals, according to an embodiment.

FIG. 3 is an example flowchart 300 illustrating the method to operate a chatbot-based LLM to respond to questions about a sales call according to an embodiment. In an embodiment, the method is performed by the agent (FIG. 1,135), and executed over a server (FIG. 1, 130).

At S310, a question is received from the user. In an embodiment, the question is related to a sales call, sales meeting, sales cost, and the like. For example, a user may ask "What did the customer ask about pricing on the call?" In certain embodiments, the user will input the question to the agent through a software portal. The user will input the question via text or audio-based input. The audio-based input will be transformed into text using automatic speech recognition (ASR) technology.

At S320, the prompt is fed to an STLM to rephrase the input question. The rephrased question is a more coherent version of the input question. In an embodiment, S320 is optional.

At S330, filters are generated based on the rephrase question by the STLM. Filters refer to metadata defined within the call dataset. To this end, the (rephrased) question is fed to an STLM, which returns a set of filters (e.g. in JSON format). The generated filters are applied to the metadata in the call dataset to filter out irrelevant information to the rephrased question. For example, if the rephrased question requires an answer based on a specific meeting (e.g., what is the topic of sales meeting A from Client X?"), the STLM may return filters for all the sales meetings conducted with Client X based on one the rephrased question.

At S340, information in the call dataset is filtered based on the filters to retrieve a target dataset. In an embodiment, the target dataset contains the most relevant information from the call dataset that pertains to the rephrased question. The contents of the call dataset are defined below.

At S350, the rephrased question is embedded into a vector. S350 includes applying one or more vector embedding techniques. Such techniques are disclosed in detail below with reference to FIGS. 6 through 9. Generally, by applying such techniques words are represented as real-valued vectors in a predefined vector space.

At S360, the target dataset (of the call dataset) is searched using the generated vectors. As noted above, the call dataset (hence, the target datasets) includes vector representations of textual information. Thus, transforming the question into a vector representation allows accurate and fast lookup of information relevant to the question. It should be noted that as the search is against the target dataset (which is filtered to relevant information), a fast retrieval of the results is ensured. In an embodiment, S360 includes comparing the vector representation of the rephrased question to the vector representations of textual information in the date dataset in order to find the target dataset. In an embodiment, the target dataset is the relevant textual data to the rephrased question and contains the answer to the rephrased question. The vector comparison is done by similarity algorithms (e.g., Facebook Artificial Intelligence Similarity Search (FAISS) index, pinecone) to find the target dataset.

At S370, related contextual information is obtained. In an embodiment, S370 includes, for example, querying a CRM system about a specific field (e.g., customer name) mentioned in the question, retrieving related emails to, e.g., customer name, and the like.

At S380, a prompt is engineered. In an embodiment, S380 includes aggregating matching information from the call dataset, and the retrieved contextual data into a single coherent prompt along with the (rephrase) question. In an embodiment, the retrieved data and information may be embedded into a predefined format of a prompt together with the question. For example, such a format may include:

Prompt: {<command>, <question>, <relevant data from a call dataset>, <related contextual information>

The command may include "answer", "answer with a specific number of words", and the like. In an embodiment, the prompt is engineered in a specific format that is compatible with a type of the model of the STLM. Typically, a prompt is a string of characters and/or symbols.

At S390, the engineered prompt is fed to an STLM, and the output of the STLM is provided to the user as an answer. In an embodiment, a user may enter a follow-up question. If the user enters a follow-up question, the entire process repeats. In some cases, a user may be requested to rank the answer. Answers receiving a rank over a predefined threshold are added to a database of best-answered questions.

It should be noted that an STLM is an LLM, such as, but not limited to, T5, GPT, GPT3, GPT4, and the like, trained on a specific customer's data. The STLM may be trained for example, on previous calls, emails, CRM data, and the like.

Figure 4:
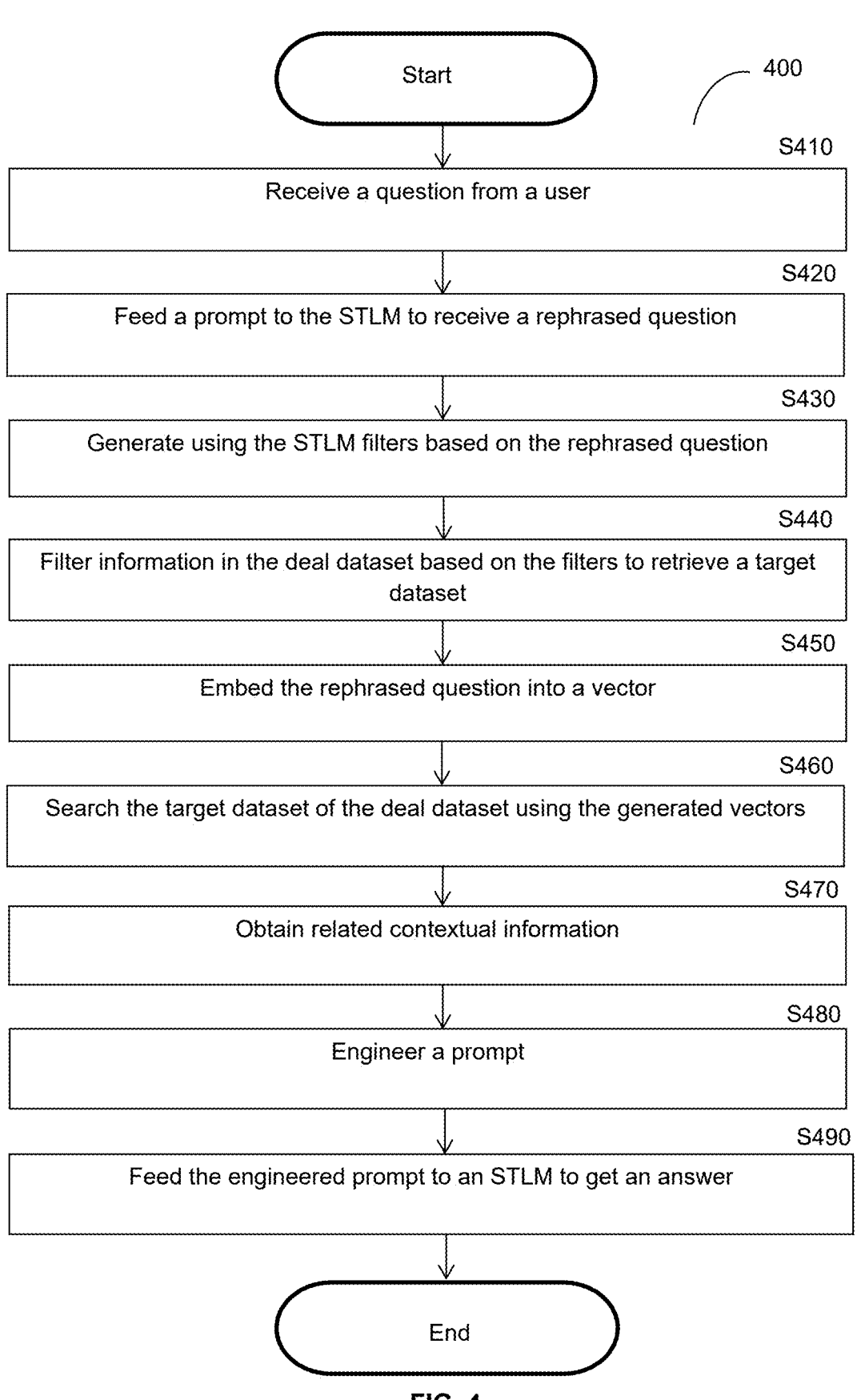
FIG. 4 is a flowchart illustrating a method for operating a chatbot-based LLM to respond to questions about a sales deal or a group of deals according to an embodiment.

FIG. 4 is an example flowchart 400 illustrating the method for operating a chatbot-based LLM to respond to questions about a sales deal or a group of deals according to an embodiment. In an embodiment, the method is performed by the agent (FIG. 1,135) and executed over a server (FIG. 1, 130).

At S410, a question is received from the user. In an embodiment, the question is related to a specific deal or a group of deals. For example, a user may ask "Which person should I involve in the deal now?" or "How should we mitigate the customer's concerns about the price?". In certain embodiments, the user will input the question to the agent through a software portal. The user will input the question via text or audio-based input. The audio-based input will be transformed into text using automatic speech recognition (ASR) technology.

At S420, the prompt is fed to an STLM to receive a rephrased question. The rephrased question is a more coherent version of the input question. In an embodiment, S420 is optional.

At S430, filters are generated based on the rephrase question by the STLM. Filters refer to metadata defined within the deal dataset. To this end, the (rephrased) question is fed to an STLM, which returns a set of filters (e.g. in JSON format). The generated filters are applied to the metadata in the deal dataset to filter out irrelevant information to the rephrased question. For example, if the rephrased question requires an answer based on a stage of deals (e.g., what deals are in a closure stage?) the STLM may return filters related to a sales pipeline stage of "closure".

At S440, information in the deal dataset is filtered based on the generated filters to retrieve a target dataset. In an embodiment, the target dataset contains the most relevant information from the deal dataset that pertains to the rephrased question. The contents of the deal dataset are defined below.

At S450, the rephrased question is embedded into a vector. S450 includes applying one or more vector embedding techniques. Such techniques are disclosed in detail below with references to FIGS. 6 and 9. Generally, by applying such techniques words are represented as real-valued vectors in a predefined vector space.

At S460, the target dataset (of the deal dataset) is searched using the generated vectors. As noted above, the deal dataset (hence the target datasets) includes vector representations of textual information. Thus, transforming the question into a vector representation allows accurate and fast lookup of information relevant to the question. It should be noted that as the search is against the target dataset (which is filtered to relevant information), a fast retrieval of the results is ensured. In an embodiment, S460 includes comparing the vector representation of the rephrased question to the vector representations of textual information in the date dataset in order to find the target dataset. In an embodiment, the target dataset is the relevant textual data to the rephrased question and contains the answer to the rephrased question. The vector comparison is done by similarity algorithms (e.g., FAISS index, pinecone) to find the target dataset.

At S470, related contextual information is obtained. In an embodiment, S470 includes, for example, querying a CRM system about a specific field (e.g., customer name) mentioned in the question, retrieving related emails to, e.g., customer name, and the like.

At S480, a prompt is engineered. In an embodiment, S480 includes aggregating matching information from the deal dataset and the retrieved contextual data into a single coherent prompt along with the (rephrased) question. In an embodiment, the retrieved data and information may be embedded into a predefined format of a prompt together with the question. For example, such a format may include:

Prompt: {<command>, <question>, <relevant data from a call dataset>, <related contextual information>

The command may include "answer", "answer with a specific number of words", and the like. In an embodiment, the prompt is engineered in a specific format that is compatible with a type of the model of the STLM. Typically, a prompt is a string of characters and/or symbols.

At S490, the engineered prompt is fed to an STLM, and the output of the STLM is provided to the user as an answer. In an embodiment, a user may enter a follow-up question. If the user enters a follow-up question, the entire process repeats. In some cases, a user may be requested to rank the answer. Answers receiving a rank over a predefined threshold are added to a database of best-answered questions.

It should be noted that an STLM is an LLM, such as, but not limited to, T5, GPT, GPT3, GPT4, and the like, trained on a specific customer's data. The STLM may be trained for example, on previous calls, emails, CRM data, and the like.

FIG. 5 is an example flowchart 500 illustrating the method for operating a chatbot-based LLM to respond to questions about product development according to an embodiment. In an embodiment, the method is performed by the agent (FIG. 1,135), and executed over a server (FIG. 1, 130).

At S510, a question is received from the user. In an embodiment, the question is related to product development, such as certain products, features, timelines, or the like. For example, a question may be, "When is the release date of version 5.0?" or "How many bugs were recorded in version 2.1?". The question may be factual (e.g., "When is the smart-trackers editing feature coming out?") or non-factual (e.g., "Why has this deal not progressed in the last two weeks?"). In certain embodiments, the user will input the question to the agent through a software portal. The user will input the question via text or audio-based input. The audio-based input will be transformed into text using automatic speech recognition (ASR) technology.

At S520, the prompt is fed to an STLM to receive a rephrased question, which is a more coherent version of the input question. In an embodiment, S520 is optional.

At S530, filters are generated based on the rephrase question by the STLM. Filters refer to metadata defined within the product dataset. To this end, the (rephrased) question is fed to an STLM, which returns a set of filters (e.g. in JSON format). The generated filters are applied to the metadata in the product dataset to filter out irrelevant information to the rephrased question. For example, if the rephrased question requires an answer based on the release date of a feature, the STLM may return filters related to version numbers and date ranges.

At S540, information in the product dataset is filtered based on the filters to retrieve a target dataset. In an embodiment, the target dataset contains the most relevant information from the product dataset that pertains to the rephrased question. The contents of the product dataset are defined below.

At S550, the rephrased question is embedded into a vector. S550 includes applying one or more vector embedding techniques. Such techniques are disclosed in detail below with reference to FIGS. 6 through 9. Generally, by applying such techniques words are represented as real-valued vectors in a predefined vector space.

At S560, the target dataset (of the deal dataset) is searched using the generated vectors. As noted above, the product dataset (hence the target datasets) includes vector representations of textual information. Thus, transforming the question into a vector representation allows accurate and fast lookup of information relevant to the question. It should be noted that as the search is against the target dataset (which is filtered to relevant information), a fast retrieval of the results is ensured. In an embodiment, S560 includes comparing the vector representation of the rephrased question to the vector representations of textual information in the product dataset in order to find the target dataset. In an embodiment, the target dataset is the relevant textual data to the rephrased question and contains the answer to the rephrased question. The vector comparison is done by similarity algorithms (e.g., FAISS index, pinecone) to find the target dataset.

At S570, related contextual information is obtained. In an embodiment, S570 includes, for example, retrieving information related to similar products or features mentioned in the question.

At S580, a prompt is engineered. In an embodiment, S580 includes aggregating matching information from the product dataset and the retrieved contextual data into a single coherent prompt along with the (rephrased) question. In an embodiment, the retrieved data and information may be embedded into a predefined format of a prompt together with the question. For example, such a format may include:

Prompt: {<command>, <question>, <relevant data from a call dataset>, <related contextual information>

The command may include "answer", "answer with a specific number of words", and the like. In an embodiment, the prompt is engineered in a specific format that is compatible with a type of the model of the STLM. Typically, a prompt is a string of characters and/or symbols.

At S590, the engineered prompt is fed to an STLM, and the output of the STLM is provided to the user as an answer. In an embodiment, a user may enter a follow-up question. If the user enters a follow-up question, the entire process repeats. In some cases, a user may be requested to rank the answer. Answers receiving a rank over a predefined threshold are added to a database of best-answered questions.

The processes have been discussed above with a reference to a specific embodiment where one rephrased question is provided. In some embodiments, multiple rephrased questions are generated using the STLM, and each rephrased question is embedded into a vector. A search against the dataset is performed using each such vector, and the prompt is based on the different target datasets returned by the respective search. Such embodiments would further improve the accuracy of the engineered prompt, and hence the answer.

It should be noted that an STLM is an LLM, such as, but not limited to, T5, GPT, GPT3, GPT4, and the like, trained on a specific customer's data. The STLM may be trained for example, on previous calls, emails, CRM data, and the like.

As mentioned above, questions are embedded or transferred into a vector representation. A vector is a one-dimensional data structure with elements of a single data type. Vectors have a dynamic structure and can change sizes. A vector contains components, which are the members of the vector. Example vector implementations can be seen in FIGS. 6 through 9.

Figure 6:
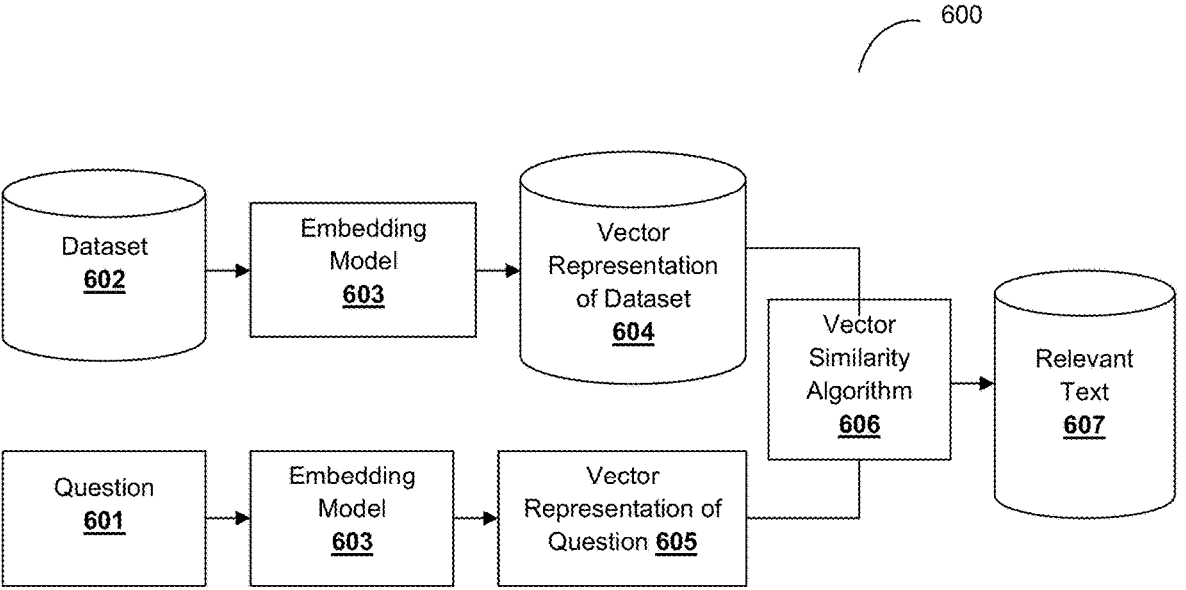
FIG. 6 is an example embodiment of a flow diagram to translate the question to a vector space.

FIG. 6 is an example flow diagram 600 translating the question to a vector space, according to an embodiment. The embedding model 603 translates an input text (e.g., a question 601) into vector representation 605. The embedding model 603 translates a dataset 602 into vector representations 604. A dataset 602 may include any one or combination of the call dataset, the product dataset, and the deal dataset mentioned.

The embedding model 603 may be implemented using one or more sentence-embedding models. Examples of sentence-embedding models include SentenceBert, InstructorEmbedding, Open-Source Artificial Intelligence (OpenAI)'s text-embedding-ada-002 model, and the like. The vector similarity algorithm 606 compares the vector representation question 605 with the vector representation 604 to find the closest relevant text 607 to question 601.

Figure 7:
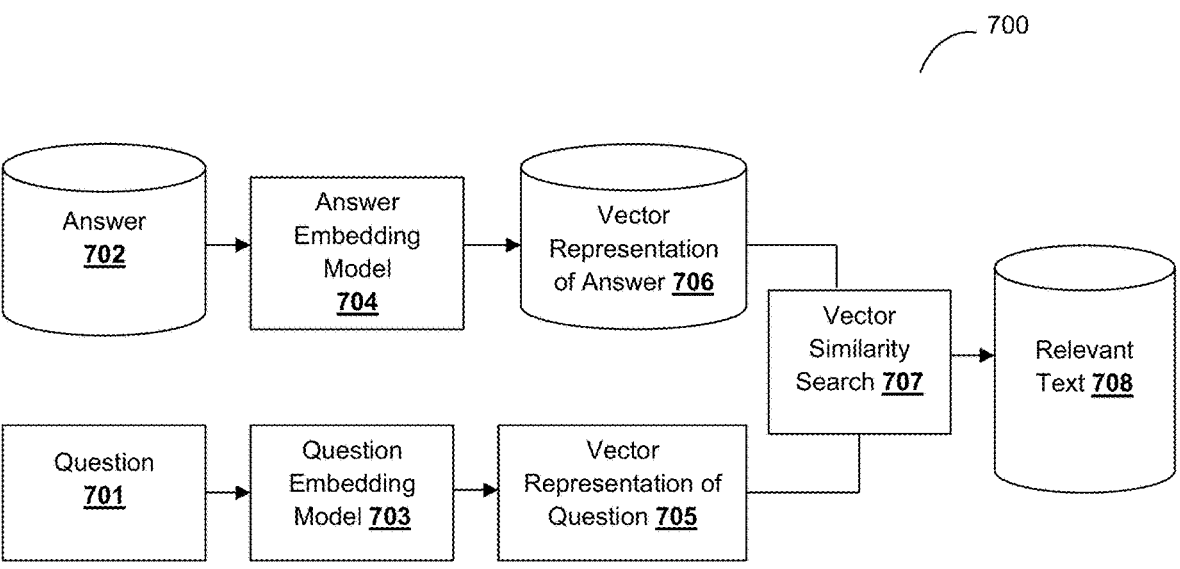
FIG. 7 is an example embodiment of a flow diagram of a single vector embedding model based on two distinct vector embedding models. One of the models embeds questions, and the other model embeds the answers.

FIG. 7 is an example flow diagram 700 of a single vector embedding model based on two distinct vector embedding models, according to an embodiment. One of the distinct vector embedding models is the question embedding model 703, which translates a question 701 into a vector representation of 705. The second distinct vector embedding model is the answer embedding model 704 which translates an answer 702 into a vector representation of the answer 706. Then, a dataset of questions and answers are created from message data, transcript data, and the like, to jointly train the two embedding models 703 and 704 to embed a question 701 and the corresponding answer 702 to a joint vector space. This process is performed in a way where the related question-answer pair would return a pair of vectors close to each other in the vector similarity search 707. At the same time, a random question and answer unrelated to question 701 may be translated into vectors with a significant distance between them as an output for the vector similarity search 707. In an embodiment, the vector similarity search 707 includes a vector similarity algorithm that compares the distance of the vector representation of question 705 and the vector representation of an answer 706 to find the closest relevant text 708, which may contain the answer 702.

In an embodiment, the question embedding model 703 and the answer embedding model 704 may be trained using, for example, a triplet-loss method or other methods such as Dense Passage Retriever (DPR), Retrieval-Augmented Generation (RAG), ATLAS, and the like. Models such as InstructorEmbeddings, which give different embeddings for different instructions and instruct differently for questions 701 and answers 702, may be utilized. For the best performance, such vector embedding models 703 and 704 may be further trained or fine-tuned over our data.

Figure 8:
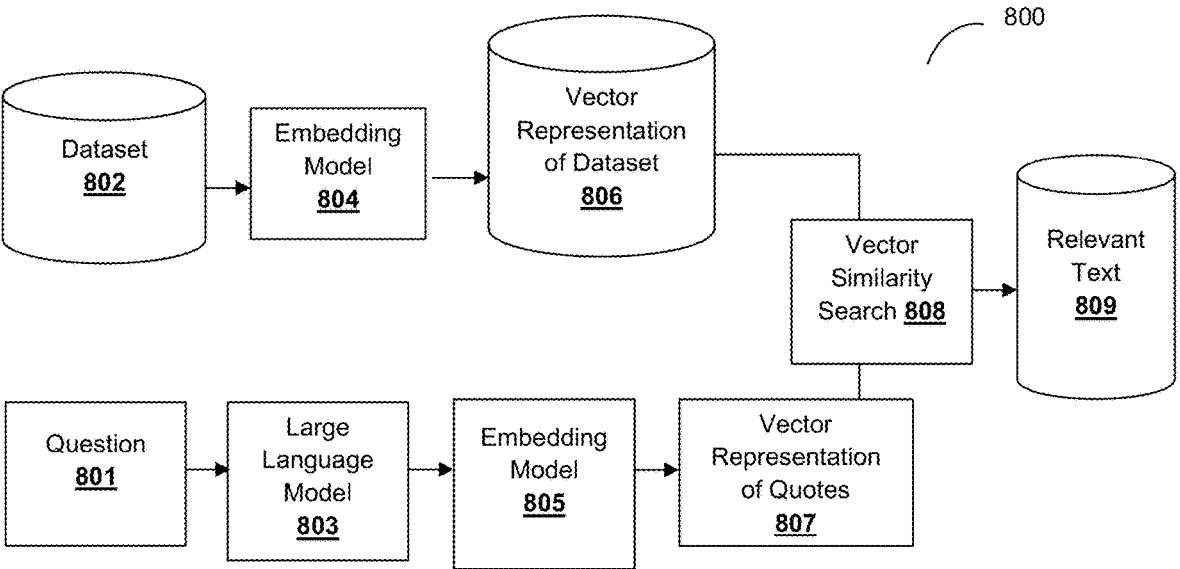
FIG. 8 is an example embodiment of a flow diagram of an agent asking a Large Language Model (LLM) to generate diversified quotes.

FIG. 8 is an example flow diagram 800 of an agent asking a Large Language Model (LLM) to generate diversified quotes from textual data, according to an embodiment. Textual data includes message data and transcript data. The generated quotes are generic answers to the question 801. As an example, for the question 801 "Why hasn't the deal progressed in the last month?" the LLM 803 may generate random quotes such as "We're out of the office this week" and "We should discuss pricing first."

The embedding model 805 (some examples are provided above) may embed and/or translate the generated quotes into vector representation 807. The embedding model 804 (some examples are provided above) may embed and/or translate the dataset 802 into vector representation 806. The embedding model 804 may be the same embedding model 805 or it may be a distinct and separate embedding model in the configuration. The dataset contains textual data from various sources such as emails, call transcripts, instant messages, audio conversations, phone calls, and the like.

The vector similarity search 808 would compare the vector representation of the quotes 807, to the vector representation of the dataset 806 to find relevant text 809 from the dataset 806. The vector representation of the quotes 807 lies in the answers embedding space. Thus, the vector representation of the quotes 807 would be very close to the vector representation of the dataset.

As an example, if a user input question is "Why hasn't the deal progressed in the last month?", a generated quote would be "We're out of the office this week.", and the similar and corresponding dataset response would be "Our Chief Financial Officer is out of office this month, so we will have to discuss this again when she is back."

The vector similarity search 808 uses the vector representation of quotes 807 to efficiently search the vector representation of the dataset 806 for relevant text 809 containing the answer to the question 801. The generated quotes are not actual answers to questions 801, but enable the agent (FIG. 1, 135) to use the generated quote to identify relevant text 809 and/or an answer from the dataset 802. The generated quote will be removed after the retrieval of the relevant text 809 from the dataset 802.

Figure 9:
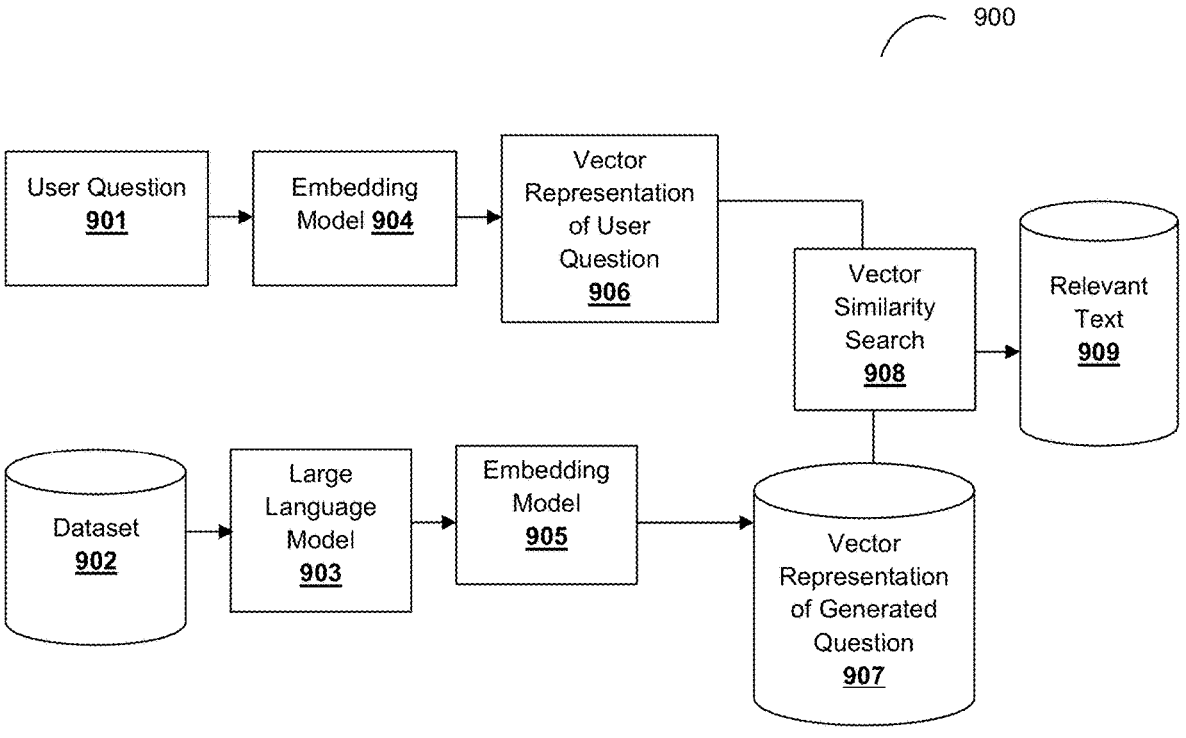
FIG. 9 is an example embodiment of a flow diagram of an agent asking the Large Language Model (LLM) to generate questions that correspond to texts of the dataset.

FIG. 9 is an example flow diagram 900 of an agent asking the Large Language Model (LLM) to generate questions that correspond to texts of the dataset. This may be performed, for example, for each dataset 902. A dataset 902 may be any of the call dataset, deal dataset, and product dataset mentioned. The user question 901 is the question that was input by the user.

The LLM 903 is configured to generate generic questions for each sentence, monologue, and/or paragraph of the dataset 902. The embedding model 905 (some examples are provided above) may embed and/or translate the generated questions from the LLM into vector representations 907.

The embedding model 904 (some examples are provided above) may embed and/or translate the user question 901 into vector representation 906. The embedding model 904 may be the same embedding model 905 used to embed and/or translate the generated questions from the LLM 903 or may be a distinct and separate embedding model.

The vector similarity search process 908, may use a similarity algorithm to compare the vector representation of the generated questions 907 from the LLM 903 to the vector representations of the user question 906, to find the relevant text 909. The relevant text may include the answer to the user question 901. The vector similarity algorithm compares the vector representation of the generated question 907 to the vector representation of the user question 906 to determine if they are similar. If the vector representation of the user question 906 and the vector representation of the generated question 907 are similar, the relevant text 909 from the dataset associated with the generated question 907 is retrieved and sent to the user via a user interface.

Figure 10:
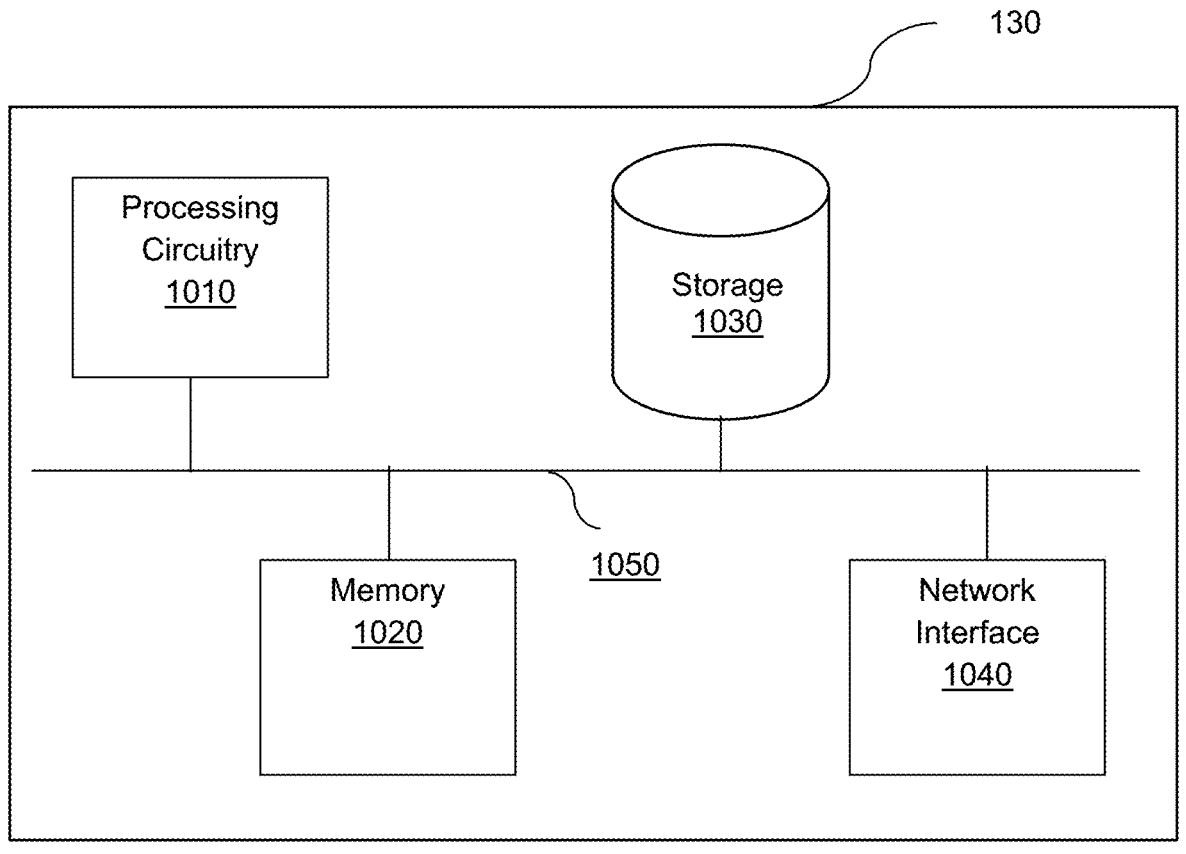
FIG. 10 is an example schematic diagram of a server for carrying out the disclosed embodiments.

FIG. 10 is an example schematic diagram of a server 130 according to an embodiment. The server 130 includes a processing circuitry 1010 coupled to a memory 1020, a storage 1030, and a network interface 1040. In an embodiment, the components of the server 130 may be communicatively connected via a bus 1050.

The processing circuitry 1010 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 1020 may be volatile (e.g., random access memory, etc.), non-volatile (e.g., read-only memory, flash memory, etc.), or a combination thereof.

In one configuration, software for implementing one or more embodiments disclosed herein may be stored in storage 1030. In another configuration, the memory 1020 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). When executed by the processing circuitry 1010, the instructions cause the processing circuitry 1010 to perform the various processes described herein.

The storage 1030 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 1040 allows the server 130 to communicate with, for example, the databases 120 and the like.

It should be understood that the embodiments described herein are not limited to the specific architecture illustrated in FIG. 10, and other architectures may be equally used without departing from the scope of the disclosed embodiments.

It is important to note that the embodiments disclosed herein are only examples of the many advantageous uses of the innovative teachings. In general, statements made in the specification of the present application do not necessarily limit any of the various claimed embodiments. Moreover, some statements may apply to some inventive features but not to others. In general, unless otherwise indicated, singular elements may be plural and vice versa with no loss of generality. In the drawings, numerals refer to like parts through several views.

The various embodiments disclosed herein can be implemented as hardware, firmware, software, or any combination thereof. Moreover, the software may be implemented as an application program tangibly embodied on a program storage unit or computer-readable medium consisting of parts or certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code, part of the application program, or any combination thereof, which may be executed by a CPU, whether or not such a computer or processor is explicitly shown. In addition, various other peripheral units may be connected to the computer platform, such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to further the art and are to be construed as being without limitation to such specifically recited examples and conditions. Moreover, all statements herein reciting principles, aspects, and embodiments of the disclosed embodiments and specific examples are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 20; 3A; A and B in combination; B and C in combination; A and C in combination; A, B, and C in combination; 2A and C in combination; A, 3B, and 2C in combination; and the like.

What is claimed is:

1. A method for generating a large language model (LLM)-based chatbot response to an input question, comprising:

generating, using a first specific-trained language model (STLM), a set of filters based on an input question that relates to at least one sales call, wherein the generated set of filters refers to at least one metadata in a call dataset;

filtering the call dataset by applying the set of filters to the metadata included in the call dataset, wherein the call dataset further includes transcripts and their respective metadata;

embedding the input question into a vector representation;

comparing the vector representation of the input question to vector representations of textual information stored in the call dataset to retrieve a vector representation of a target dataset, wherein the target dataset contains an answer to the input question;

engineering a prompt to provide a single coherent command including information in the target dataset and the input question; and feeding the engineered prompt to a second STLM to output the answer to the input question.

2. The method of claim 1, further comprising:

retrieving a contextual information from at least one data source; and enriching the input question with the retrieved contextual information, and wherein the prompt is further engineered based on retrieved contextual information.

3. The method of claim 2, wherein the at least one data source is a CRM system.

4. The method of claim 1, wherein embedding the input question into a vector representation further comprises:

applying an embedding model on the input question, wherein the embedding model implements one or more sentence-embedding models.

5. The method of claim 1, wherein embedding the input question into a vector representation further comprises:

applying a single vector embedding model on the input question, wherein a single vector embedding model is based on two distinct vector embedding models.

6. The method of claim 1, wherein embedding the input question into a vector representation further comprises:

applying a large language model (LLM) to the input question.

7. The method of claim 1, further comprising:

rephrasing the input question using a third STLM.

8. The method of claim 7, wherein the first STLM, the second STLM, and the third STLM are same LLM trained on same sales data.

9. The method of claim 1, wherein an answer space of the input question is the call dataset and wherein the sales call further includes sales meetings and sales transactions.

10. A non-transitory computer-readable medium having stored thereon instructions for causing a processing circuitry to execute a process, the process comprising:

generating, using a first specific-trained language model (STLM), a set of filters based on an input question that relates to at least one sales call, wherein the generated set of filters refers to at least one metadata in a call dataset;

filtering the call dataset by applying the set of filters to the metadata included in the call dataset, wherein the call dataset further includes transcripts and their respective metadata;

embedding the input question into a vector representation;

comparing the vector representation of the input question to vector representations of textual information stored in the call dataset to retrieve a vector representation of a target dataset, wherein the target dataset contains an answer to the input question;

engineering a prompt to provide a single coherent command including information in the target dataset and the input question; and feeding the engineered prompt to a second STLM to output the answer to the input question.

11. A system for generating a large language model (LLM)-based chatbot response to an input question, comprising:

a processing circuitry; and a memory, the memory containing instructions that when executed by the processing circuitry, configure the system to:

generate, using a first specific-trained language model (STLM) a set of filters based on an input question that relates to at least one sales call, wherein the generated set of filters refers to at least one metadata in a call dataset;

filter the call dataset by applying the set of filters to the metadata included in the call dataset, wherein the call dataset further includes transcripts and their respective metadata;

embed the input question into a vector representation;

compare the vector representation of the input question to vector representations of textual information stored in the call dataset to retrieve a vector representation of a target dataset, wherein the target dataset contains an answer to the input question;

engineer a prompt to provide a single coherent command including information in the target dataset and the input question; and feed the engineered prompt to a second STLM to output the answer to the input question.

12. The system of claim 11, wherein the system is further configured to:

retrieve a contextual information from at least one data source; and enrich the input question with the retrieved contextual information, and wherein the prompt is further engineered based on retrieved contextual information.

13. The system of claim 12, wherein the at least one data source is a CRM system.

14. The system of claim 11, wherein the system is further configured to:

apply an embedding model on the input question, wherein the embedding model implements one or more sentence-embedding models.

15. The system of claim 11, wherein the system is further configured to:

apply a single vector embedding model on the input question, wherein a single vector embedding model is based on two distinct vector embedding models.

16. The system of claim 11, wherein the system is further configured to:

apply a large language model (LLM) to the input question.

17. The system of claim 11, wherein the system is further configured to:

rephrase the input question using a third STLM.

18. The system of claim 17, wherein the first STLM, the second STLM, and the third STLM are same LLM trained on same sales data.

19. The system of claim 11, wherein an answer space of the input question is the call dataset and wherein the sales call further includes sales meetings and sales transactions.

* * * * *